(12) United States Patent
Bernitsas et al.

(10) Patent No.: US 11,994,096 B2
(45) Date of Patent: May 28, 2024

(54) COMBINED MARINE HYDROKINETIC ENERGY HARVESTING FROM CURRENTS AND WAVES

(71) Applicants: THE REGENTS OF THE UNIVERSITY OF MICHIGAN, Ann Arbor, MI (US); Vortex Hydro Power LLC, Ann Arbor, MI (US)

(72) Inventors: Michael M. Bernitsas, Northville, MI (US); Stergios I. Liapis, Bellaire, TX (US)

(73) Assignees: THE REGENTS OF THE UNIVERSITY OF MICHIGAN, Ann Arbor, MI (US); Vortex Hydro Power LLC, Ann Arbor, MI (US)

( * ) Notice: Subject to any disclaimer, the term of this patent is extended or adjusted under 35 U.S.C. 154(b) by 0 days.

(21) Appl. No.: 18/128,293

(22) Filed: Mar. 30, 2023

(65) Prior Publication Data
US 2023/0358205 A1 Nov. 9, 2023

Related U.S. Application Data

(60) Provisional application No. 63/325,244, filed on Mar. 30, 2022.

(51) Int. Cl.
| | | |
|---|---|---|
| *F03B 17/06* | (2006.01) | |
| *F03B 13/16* | (2006.01) | |
| *F03B 13/26* | (2006.01) | |

(52) U.S. Cl.
CPC .............. *F03B 17/06* (2013.01); *F03B 13/16* (2013.01); *F03B 13/264* (2013.01);
(Continued)

(58) Field of Classification Search
CPC .... F03B 17/06; F03B 13/14; F03B 13/16–20; F03B 13/26; F03B 13/264; Y02E 10/20;
(Continued)

(56) References Cited

U.S. PATENT DOCUMENTS

| | | |
|---|---|---|
| 7,493,759 B2 | 2/2009 | Bernitsas et al. |
| 8,047,232 B2 | 11/2011 | Bernitsas et al. |

(Continued)

FOREIGN PATENT DOCUMENTS

| | | | |
|---|---|---|---|
| CN | 108678895 A | * 10/2018 | ............ F03B 13/262 |
| EP | 1812709 B1 | 4/2013 | |
| EP | 2932091 B1 | 7/2016 | |

OTHER PUBLICATIONS

Kim, Eun Soo; Hongrae Park, Hai Sun, Sung-chul Shin, Dae-Seung Cho, Michael M. Bernitsas"Development of an Alternating Lift Converter utilizing Flow Induced Oscillations to Harness Horizontal Hydrokinetic Energy", Renewable and Sustainable Energy Reviews 145, 111094, (2021); <https://doi.org/10.1016/j.rser.2021.111094>.

(Continued)

*Primary Examiner* — Mark A Laurenzi
*Assistant Examiner* — Xiaoting Hu
(74) *Attorney, Agent, or Firm* — Harness, Dickey & Pierce, P.L.C.

(57) ABSTRACT

A VIVACE converter to harness energy from currents as well as from waves— that is, the present teachings provide a method and apparatus to collect energy from both currents and waves—using the same physical components. The present teachings are particularly useful in that either currents and/or waves may exist on their own nearly everywhere in the oceans and frequently coexist.

11 Claims, 9 Drawing Sheets

(52) U.S. Cl.
CPC ....... *F05B 2240/40* (2013.01); *F05B 2240/93* (2013.01); *F05B 2240/95* (2013.01); *Y02E 10/20* (2013.01); *Y02E 10/30* (2013.01)

(58) Field of Classification Search
CPC .. Y02E 10/30; F05B 2240/40; F05B 2240/93; F05B 2240/95; F05B 2240/97
See application file for complete search history.

(56) References Cited

U.S. PATENT DOCUMENTS

| | | | |
|---|---|---|---|
| 8,684,040 | B2 | 4/2014 | Bernitsas et al. |
| 10,378,507 | B2 | 8/2019 | Kennedy et al. |
| 11,143,158 | B2 | 10/2021 | Bernitsas et al. |
| 2008/0295509 | A1* | 12/2008 | Bernitsas ................ F03G 7/08 60/497 |
| 2009/0114001 | A1 | 5/2009 | Bernitsas et al. |
| 2019/0145373 | A1 | 5/2019 | Lehmann et al. |
| 2020/0408186 | A1 | 12/2020 | Bernitsas et al. |

OTHER PUBLICATIONS

A. LiVecchi et al., "Powering the Blue Economy: Exploring Opportunities for Marine Renewable Energy in Maritime Markets," U.S. Department of Energy, Office of Energy and Renewable Energy, Washington, D.C., 2019.

Lv, Yanfang; Liping Sun, Michael M. Bernitsas, Hai Sun, "A Comprehensive Review of Nonlinear Oscillators in Hydrokinetic Energy Harnessing using Flow-Induced Vibrations", Renewable & Sustainable Energy Reviews; 150, (2021), 111388.

Sun, H., & Bernitsas, M. M. (2019). Bio-Inspired adaptive damping in hydrokinetic energy harnessing using flow-induced oscillations. Energy, 176, 940-960.

International Search Report and Written Opinion regarding International Patent Application No. PCT/US2023/016814, dated Jul. 14, 2023.

Xu et al. Performance of single-cylinder VIVACE converter for hydrokinetic energy harvesting from flow-induced vibration near a free surface, Ocean engineering, Oct. 6, 2020, pp. 1-12. pp. 1-5.

* cited by examiner

(a) Top View

FIG. 3A (b) Side View

FIG. 3B (c) End View

| U (m/s) | Harnessed Power (Watts) | | | Ratio Two to Isolated | Ratio Three to Isolated |
|---|---|---|---|---|---|
| | Single | Two | Three | | |
| 0.95 | 0.94 | 13.04 | 24.91 | 13.85 | 26.46 |
| 1.03 | 5.65 | 19.73 | 29.79 | 3.49 | 5.26 |
| 1.15 | 7.84 | 22.79 | 33.41 | 2.90 | 4.26 |
| 1.19 | 8.86 | 21.58 | 37.22 | 2.43 | 4.19 |
| 1.23 | 9.95 | 21.70 | 40.65 | 2.18 | 4.08 |
| 1.27 | 11.85 | 23.70 | 39.93 | 1.99 | 3.36 |

|  | Wave Energy Resource kW/m | Power Absorbed [kW] Infinite depth | Power Absorbed [kW] Depth = 8m |
|---|---|---|---|
| Oregon | 31 | 51.46 | 70.35 |
| N. California | 31 | 51.46 | 70.35 |
| S. California | 22 | 36.52 | 49.92 |
| Oahu | 23 | 38.18 | 52.19 |
| US Virgin Islands | 6 | 9.96 | 13.62 |
| North Carolina | 5 | 8.3 | 11.35 |
| Rhode Island | 5 | 8.3 | 11.35 |

FIG. 9

COMBINED MARINE HYDROKINETIC ENERGY HARVESTING FROM CURRENTS AND WAVES

CROSS-REFERENCE TO RELATED APPLICATIONS

This application claims the benefit of U.S. Provisional Application No. 63/325,244, filed on Mar. 30, 2022. The entire disclosure of the above application is incorporated herein by reference.

FIELD

The present disclosure relates to energy harvesting and, more particularly, relates to combined marine hydrokinetic energy harvesting from currents and waves.

BACKGROUND AND SUMMARY

This section provides background information related to the present disclosure which is not necessarily prior art. This section provides a general summary of the disclosure, and is not a comprehensive disclosure of its full scope or all of its features.

Marine Hydrokinetic (MHK) energy exists in flows in two forms: (a) in horizontal form in rivers, ocean currents, and tides and (b) in vertical form in waves. In both forms, MHK energy is abundant and available worldwide.

A vortex induced vibration for aquatic clean energy (VIVACE) converter is a breakthrough technology, which emulates the natural and destructive phenomenon of vortex induced vibration (VIV) and enhances it by borrowing from fish-biomimetics to harness the hydrokinetic energy of even slow water currents. A VIVACE converter harnesses horizontal MHK energy using Flow Induced Oscillations (FIO). Specifically, VIVACE utilizes Vortex Induced Vibrations (VIV), galloping, and their coexistence, which are catastrophic phenomena.

Typically, extensive design and engineering are involved in suppressing FIO in numerous engineering applications. VIVACE, on the other hand, enhances and controls them to generate MHK energy. Both underlying phenomena induce alternating fish-like lift; not steady lift like wings or propellers. Elongated bodies—elastic or on elastic supports—with bluff cross-sections (e.g., cylinder, prism) in transverse flows are subjected to alternating lift. In contrast, lifting surfaces (e.g., wings, foils, propellers) in steady flows are subjected to steady lift.

In accordance with the teachings of the present disclosure, a VIVACE converter is provided to harness energy from currents as well as from waves—that is, the present teachings provide a method and apparatus to collect energy from both currents and waves using the same physical components. The present teachings are particularly useful in that either currents and/or waves may exist on their own nearly everywhere in the oceans and frequently coexist. The current-wave MHK energy converter according to the present disclosure is generally referred to as VIVACE-W.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9 gives estimates of wave power absorbed by a three-cylinder VIVACE device. The cylinders have a diameter of 1.5 m and a length of 12 m. Their center is submerged 1 m below the free surface. Estimates are given for different locations in the continental US, Hawaii and the Caribbean islands. Two cases are considered: A water depth is greater than half wavelength so it can be considered infinite and a water depth of 8 m.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

To enhance the usefulness of MHK energy technologies, the present teachings provide a method and apparatus to collect energy from both currents and waves. The present teachings are particularly useful in that either currents and/or waves may exist on their own nearly everywhere in the oceans and frequently coexist.

By way of technical background and understand, there are several issues to consider in connection with the implementation of energy harvesting systems.

Firstly, the vast majority of ocean currents are slower than 3 knots and typical rivers are slower than 2 knots. However, conventional turbines and open-water propellers require a minimum of 4 knots for operation and 5 knots for financial viability. VIVACE, according to the present teachings, can function in 2 knots and based on appropriate modeling the present teachings provide energy generation at only 0.6 knots (~0.3 m/s).

Secondly, there is a perceived environmental incompatibility to use MHK technology—that is, there is opposition to deployment of experimental turbines and open propellers due to anticipated interference with swimmers, divers, boaters, and marine life. However, VIVACE, according to the present teachings, uses alternating lift, similar to fish, and thus is environmentally compatible. In fact, the cylinders or other structure used in VIVACE similarly promote marine life as fish tend to thrive in the wake of cylinders.

Thirdly, the power density of turbine-based technologies is very low. Specifically, large spacing is needed between turbines in the direction of the flow to minimize interference, which is often referred to as the proverbial Achilles heel of all renewables. For example, onshore windfarms have power density of 0.01 W/m3 (at 12 m/s), where volume is measured to the tip of the top blade. VIVACE, according to the present teachings, has achieved power density of 640 W/m3 at equivalent flow velocity (1.3 m/s).

Fourthly, the marine environment is relentless in terms of high forces, random excitation, corrosion, foundation, seals, bearings, deployment, and more, which can result in high costs related to maintenance and repair. In a recent solicitation for new MHK concepts in 2016, the EERE (Energy Efficiency and Renewable Energy) office of DOE set a target for MHK energy of 015/kWh by the year 2030. This is not competitive with conventional systems.

Fifthly and finally, the marine environment is ever changing—there is always motion indicating the presence of MHK energy. There are places where there are very slow currents particularly below the wave zone, places closer to the surface where waves are present, or places where the two may coexist. Waves are intermittent and wave energy devices sit idle about 70% of the time. At that time currents may exist. A device able to harness the energy from both waves and currents using the same hardware while encompassing two different principles would be most effective in reducing the time that such an energy harvester stays idle.

Presently, the VIVACE Converter according to the principles of the present teachings has reached a viable stage of development and can be built for deployment. VIVACE has proven to be successful in advancing the state of the art in at least the first three points set forth above, with continuous effort to address the fourth point. The present disclosure thus presents a method and device that enables, for the first time, the ability to harvest MHK energy both from waves and currents. In addition, it addresses the fourth point by reducing the down time of the device compared to separate current and wave energy harvesters.

VIVACE technology continues to grow in providing:

Hydrodynamic design: This presently focuses on synergistic Flow Induced Oscillations (FIO), where bodies in close proximity can extract more energy than by being in hydrodynamic isolation.

Mechanical oscillator: By introducing nonlinear oscillators, performance of the VIVACE Converter has significantly improved.

Power Take Off (PTO): There are several concepts of PTO systems to convert the MHK energy to electricity. In some embodiments, linear oscillatory motion may be converted to rotational motion using off-the-shelf commercial generators.

Magnetic support: One of the challenges VIVACE faces is the low lift-to-drag ratio compared to turbine blades. That is, alternating lift starts at low speeds and generates energy in an environmentally compatible way but pays penalty in higher drag in the direction of the flow. Designing minimum friction magnetic support in the marine environment results in a major boost of VIVACE's performance. This was addressed in a recently issued patent.

Nonlinear controls: The two underlying phenomena used in VIVACE hydrodynamics, Vortex Induced Vibrations (VIV) and galloping, do not have mathematical models. Extensive hydrodynamic data are collected systematically and numerical procedures are used to develop models needed for controls.

In some embodiments of the present teachings, vertical MHK energy from waves is harnessed using a vertically oscillating large displacement body following the waves and, thus, converting vertical MHK energy to mechanical in the oscillator. In some embodiments, restoring springs can be used so linear resonance can be achieved. The VIVACE Converter, in some embodiments, comprises 1-4 cylinders vertically or horizontally placed and driven by a current to respond in VIV, galloping, or their coexistence, thus, converting horizontal MHK energy to mechanical energy. Using cylinders that are horizontal, below the free surface but within the wave zone, an oscillator can harvest energy from waves and/or currents. When the incident waves are monochromatic, it has been shown that the cylinders are most effective when their heave natural period is equal to the incident wave period. In order to design an efficient wave energy harvesting system in random waves, multiple cylinders will be employed with different heave natural periods so that they can capture energy from a wide spectrum of wave periods. The natural periods of the oscillators are set by the controller by setting cyber-physically the spring stiffness of each oscillator.

Because waves are intermittent but carry a lot of energy, a dual use VIVACE Converter (VIVACE-W) increases the amount of power generated by enabling harvesting of both the vertical and horizontal MHK energy.

Figure 1:
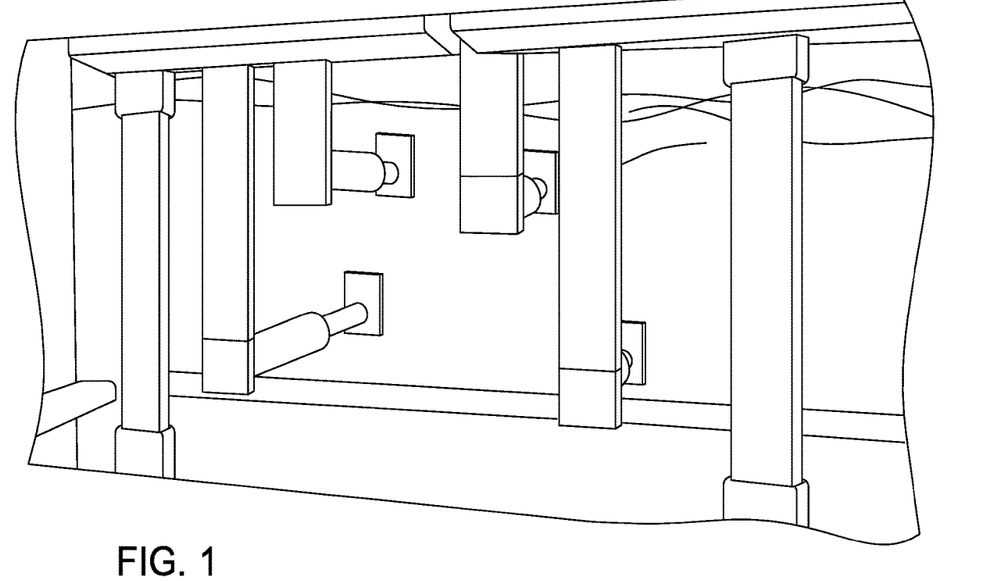
FIG. 1 illustrates a plurality of horizontal cylinders in tandem in accordance with some embodiments of the present teachings.
Figure 2:
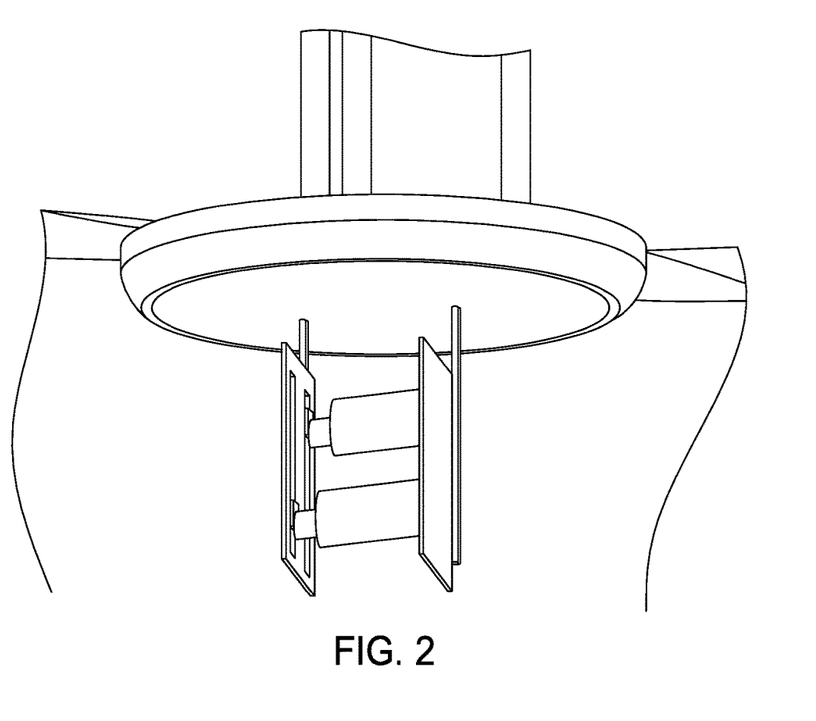
FIG. 2 illustrates a VIVACE-W Converter positioned below a buoy in accordance with some embodiments of the present teachings.
Figure 3A:
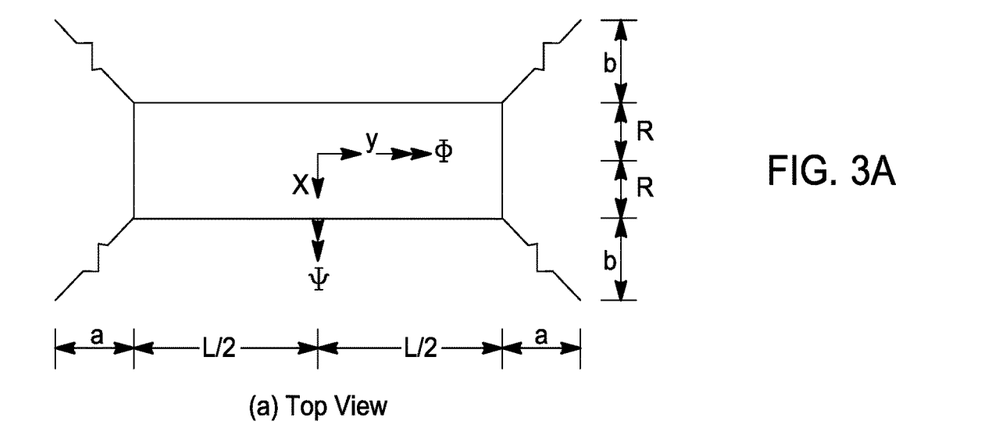
FIG. 3A illustrates a top view schematic of a VIVACE-W Converter positioned below a floating platform in accordance with some embodiments of the present teachings.
Figure 3B:
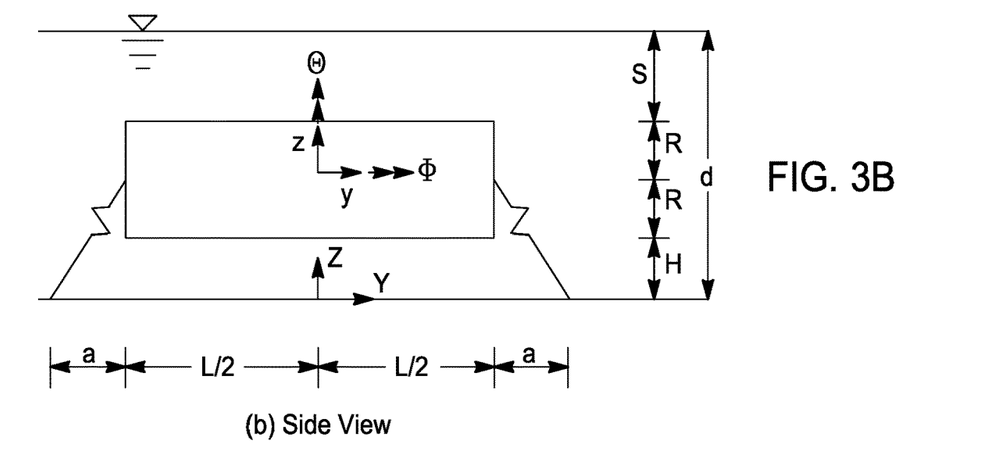
FIG. 3B illustrates a side view schematic of a VIVACE-W Converter positioned below a floating platform in accordance with some embodiments of the present teachings.
Figure 3C:
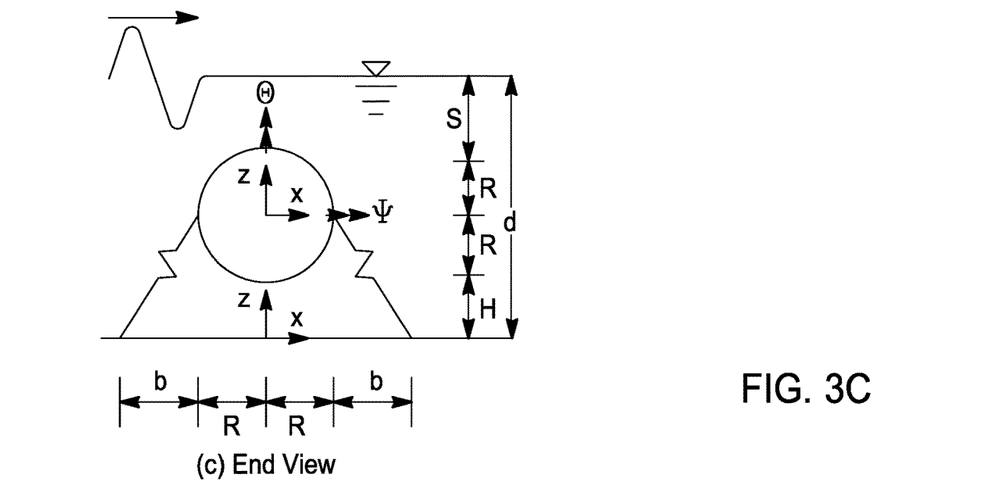
FIG. 3C illustrates an end view schematic of a VIVACE-W Converter positioned below a floating platform in accordance with some embodiments of the present teachings.
Figure 3D:
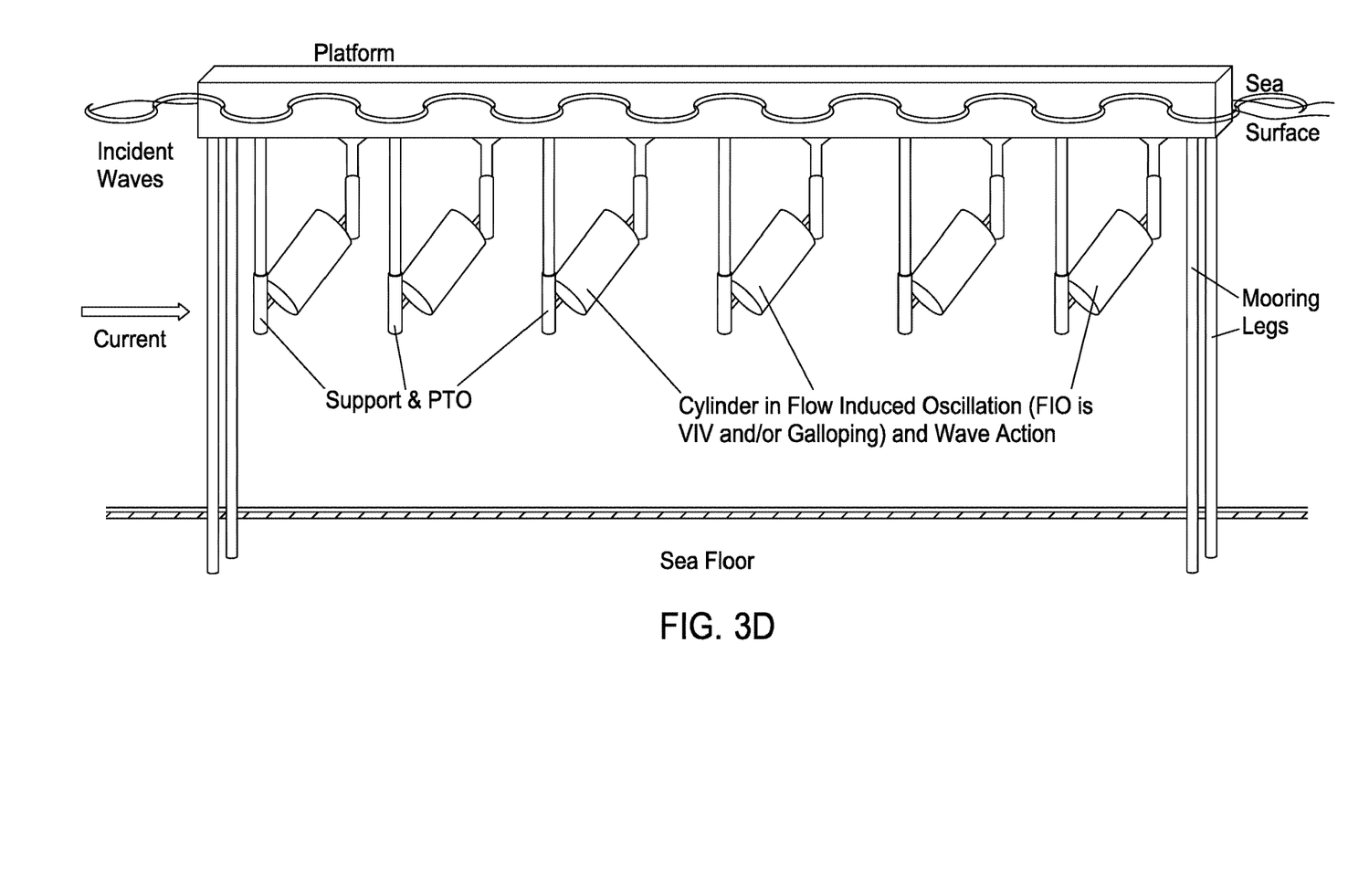
FIG. 3D illustrates a VIVACE-W Converter positioned below a floating platform in accordance with some embodiments of the present teachings.

In some embodiments of the present teachings, the device is a combination of horizontal cylinders/prisms on springs (FIG. 1) operating close to the free surface, submerged, but within the wave-zone. The oscillating cylinders/springs may carry turbulence stimulators. FIG. 2 is an example of a VIVACE-W device where the cylinders are placed under a buoy. The buoy will be moored with a taut system so it has minimal motions, while the cylinders are designed to resonate with the waves. In some embodiments, as illustrated in FIGS. 3A to 3D, each cylinder can be connected with springs to a floating platform which is connected to the ocean floor. The oscillating cylinders or prisms have shapes as in FIGS. 4A-4E.

In accordance with the present teachings, the VIVACE-W Converter comprises several benefits not found in the prior art, including but not limited to:

The oscillating bodies are cylinders or prisms of various cross-section forms as in FIGS. 4A-4E.

Cylinders/prisms are placed perpendicular to the direction of the current/tide/river and can be in any direction in that plane. That way they capture the MHK energy from currents.

The horizontal direction, perpendicular to the current direction, is selected for the cylinders/prisms so the energy from waves can also be captured.

Figure 5:
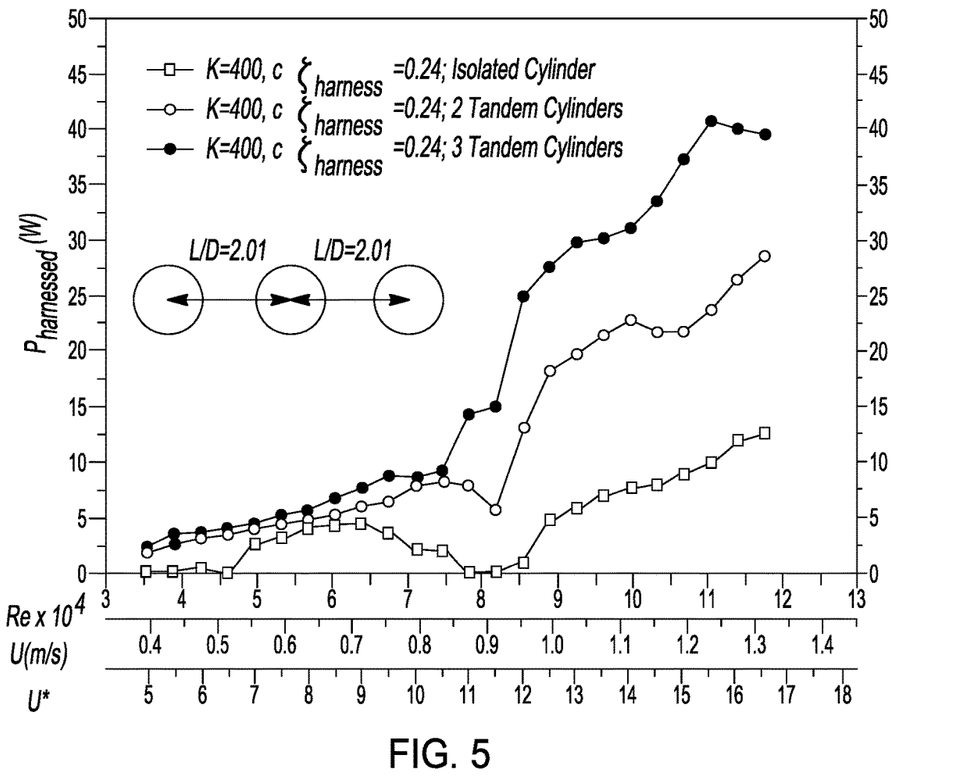
FIG. 5 illustrates a graph indicating performance of 3 oscillators in currents.
Figure 6:
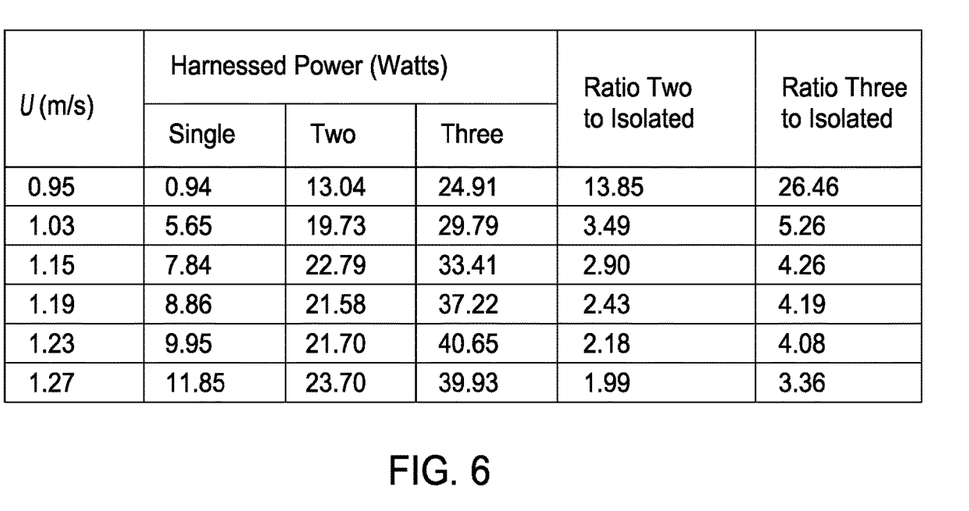
FIG. 6 illustrates a performance table indicating performance of 1-2-3 oscillators in tandem and how multiple cylinders can harness more energy in synergy than in hydrodynamic isolation.

Several oscillating bodies are placed in tandem to increase the efficiency of the device by achieving synergistic FIO (Flow Induced Oscillations). Synergistic FIO has been achieved proving that multiple bodies in FIO, in close proximity, can be designed to generate more power than in hydrodynamic isolation as shown in FIGS. 5-6. It should be appreciated that the term "tandem" should not be interpreted to mean solely situations and/or configurations where the oscillating bodies are in a perfect straight line or plane, unless specifically claimed, as variations may exist where the oscillating bodies are offset relative to each other to some extent.

Figure 7:
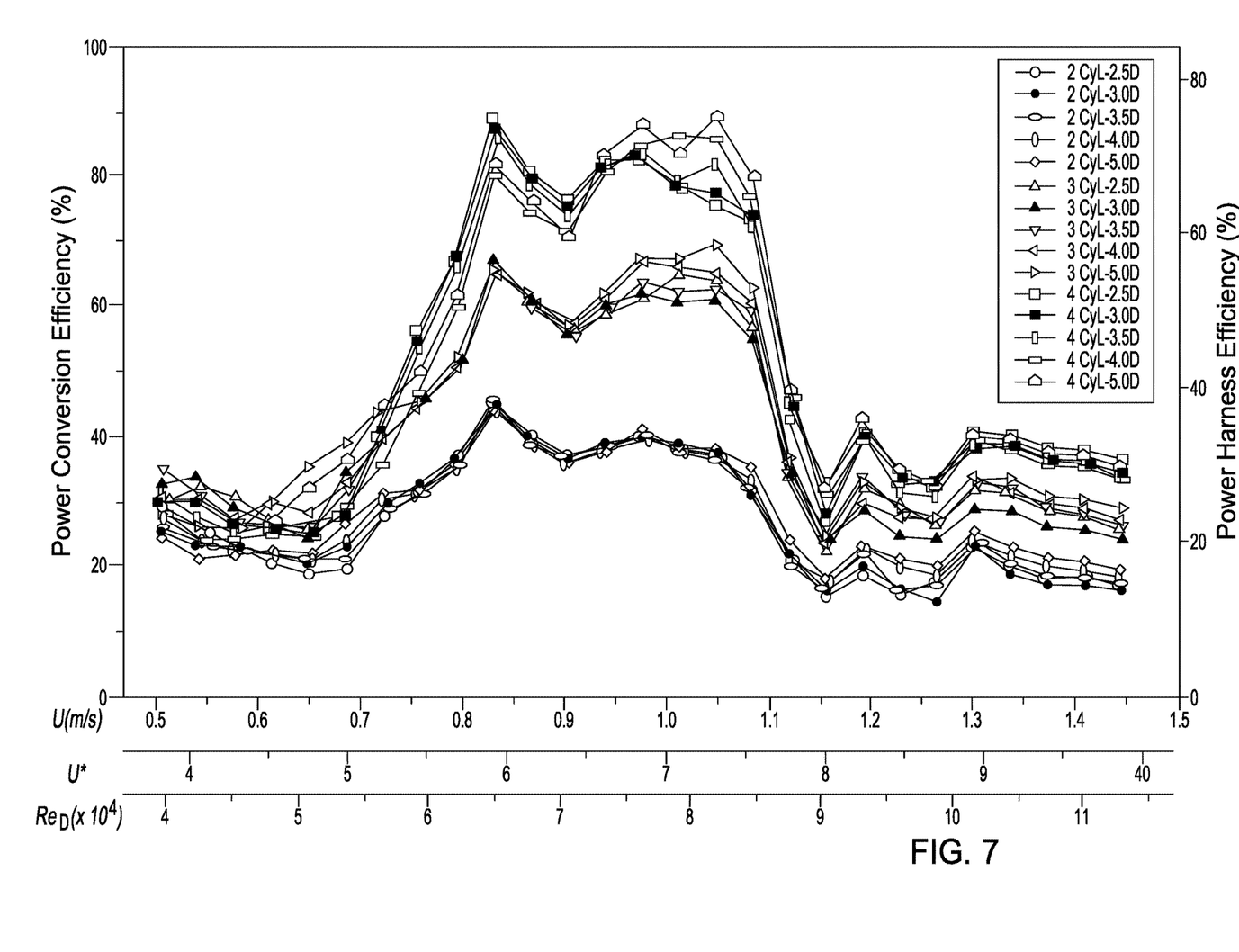
FIG. 7 illustrates a graph indicating the relative performance of 1, 2, 3, 4 cylinders in tandem (4-cylinder synergistic F10; n=88% of Betz limit. Broad range due to VIV and galloping)

Horizontal MHK energy hydrodynamic efficiency has reached 88% of the Betz theoretical maximum as shown in FIG. 7. This is achieved over a very broad range of velocity due to design of the oscillating bodies and their turbulence stimulation to achieve back-to-back VIV and galloping.

Figure 4A:
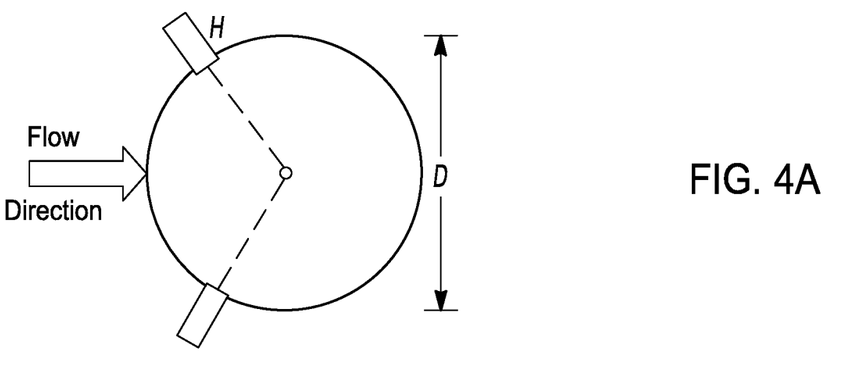
FIGS. 4A-4E illustrate examples of oscillating cylinders/prisms in accordance with some embodiments of the present teachings.
Figure 4B:
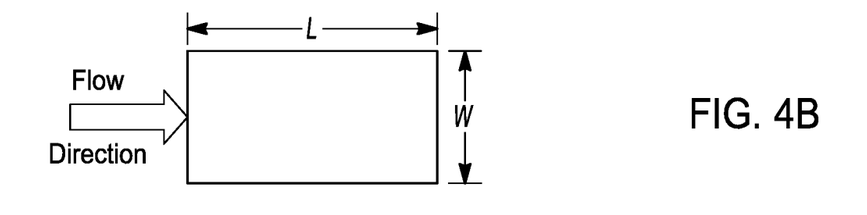
Figure 4C:
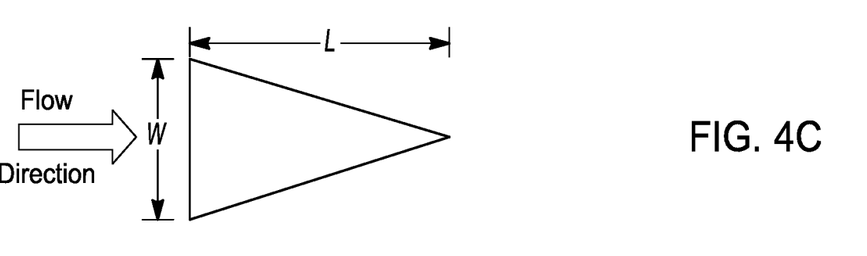
Figure 4D:
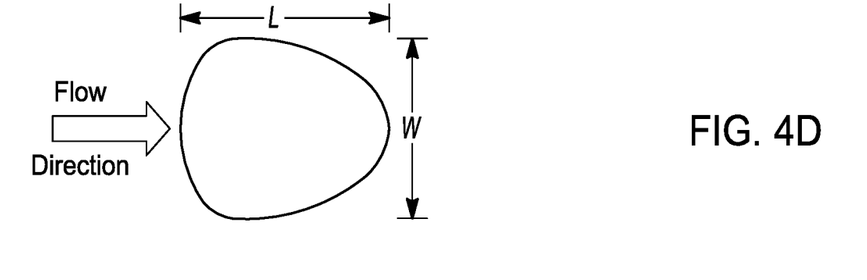
Figure 4E:
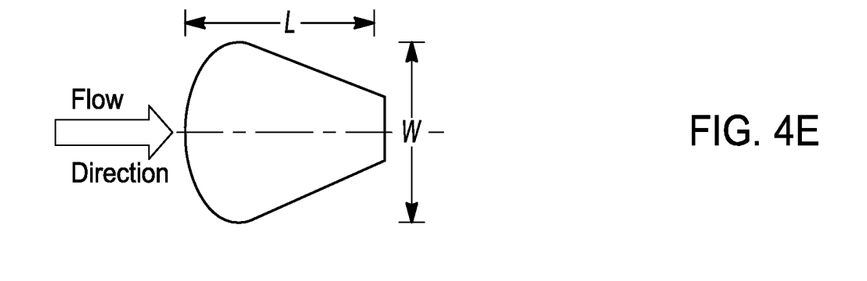
Figure 8A:
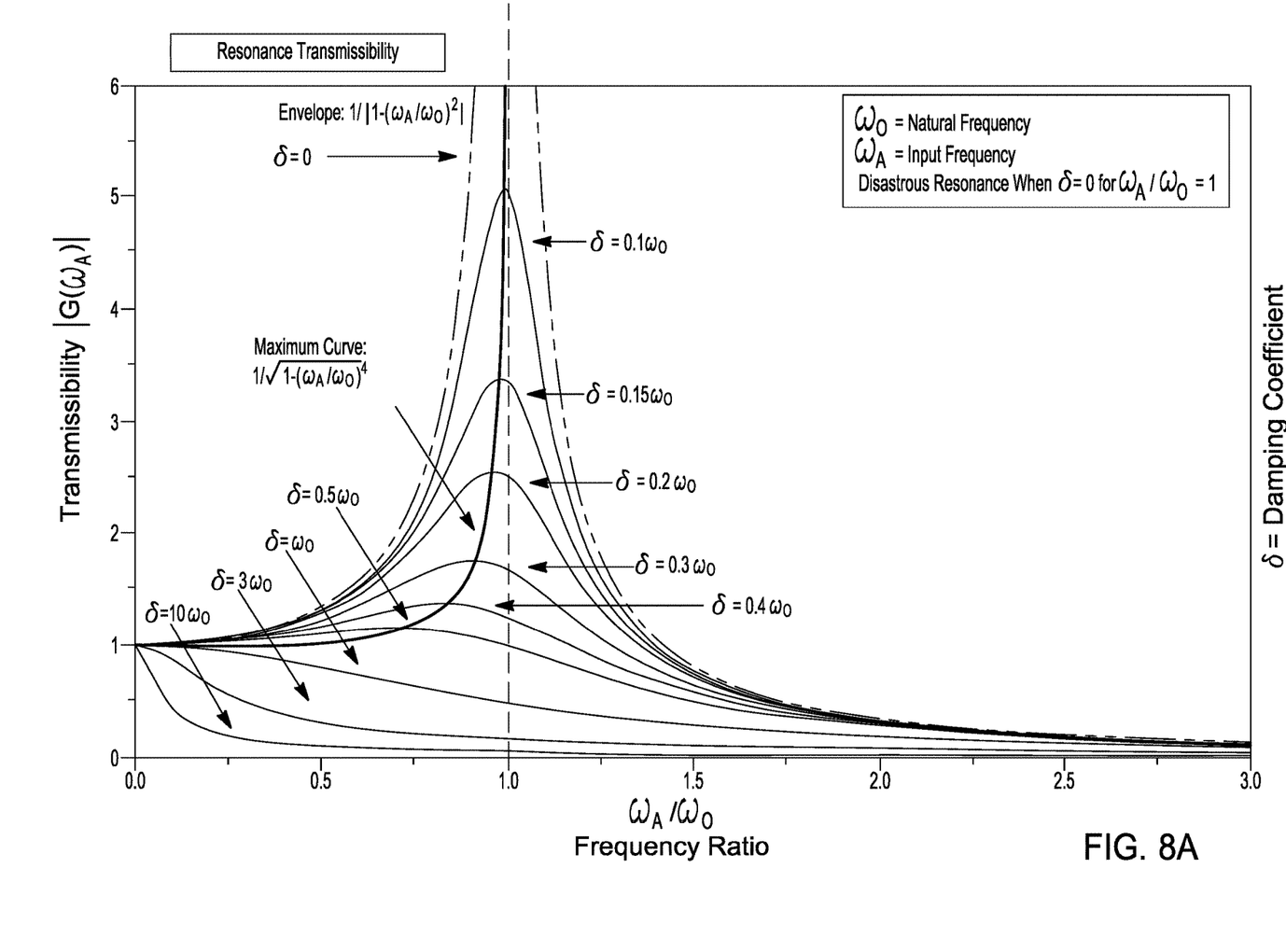
FIGS. 8A and 8B illustrate the amplitude response for different oscillator models as function of flow speed (response amplitude operators for different oscillators: Linear, VIVACE with gap and w/o gap (damping ratio as parameter))
Figure 8B:
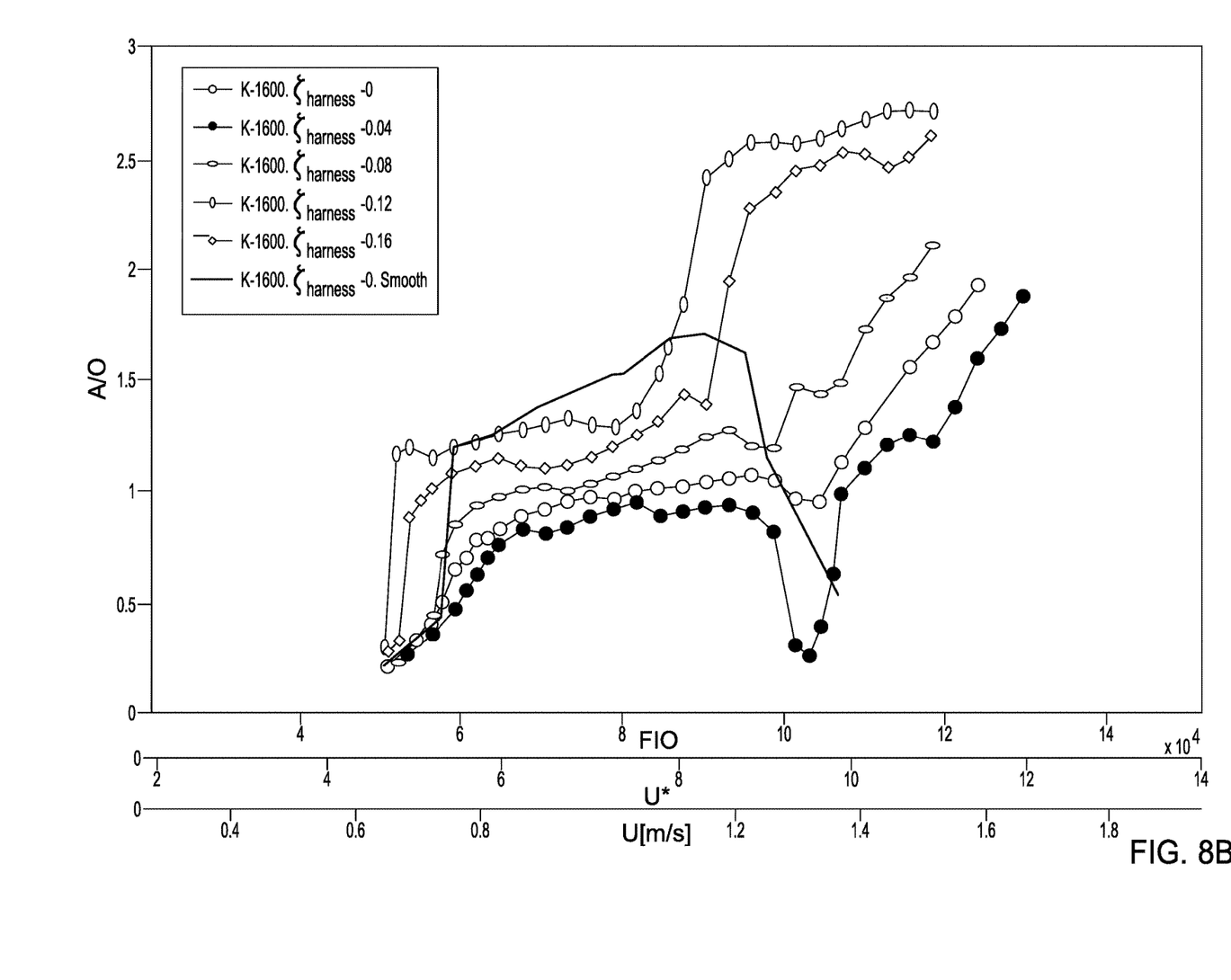
Figure 9:
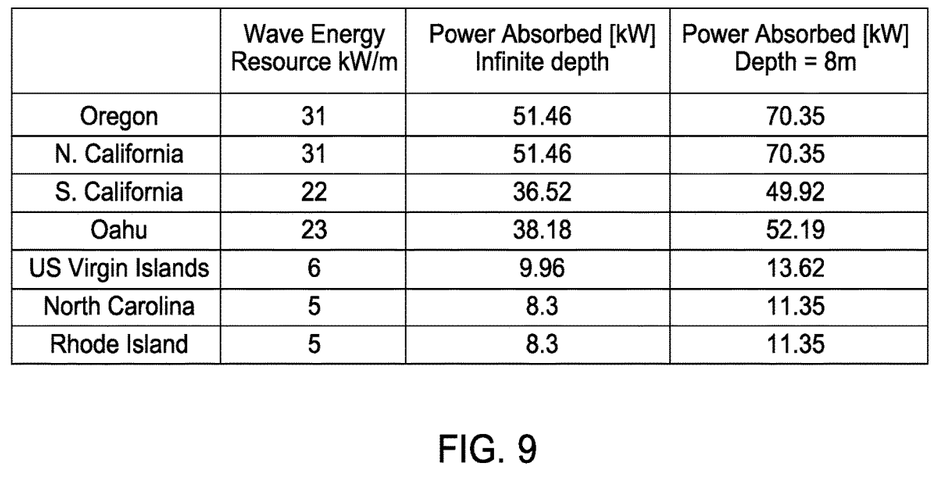

The response amplitude operator (RAO) of the VIVACE-W oscillators initiates as a linear oscillator (FIG. 7) with the initial branch of VIV. Then it continues with the upper branch of VIV (FIGS. 8A-8B) and before desynchronization of VIV, galloping is initiated at even higher response (FIGS. 8A-8B) for lower damping ratio. For high damping ratio a gap appears between VIV and galloping (FIGS. 8A-8B). This challenge has been addressed and resolved in two ways: first by adaptive damping; and second by increased turbulence stimulation (FIG. 4A). Thus, the RAO of VIVACE for horizontal MHK energy starts shortly before the natural frequency of the oscillator in quiescent water, continues with nonlinear resonance in the upper branch of VIV, and smoothly moves into galloping with large uninterrupted response.

To capture the vertical MHK energy, the dimensions and parameters (oscillating mass $m_{osc}$, spring stiffness K, spacing) of the oscillators are selected to closely resonate with the wave field.

The final adjustment of the natural frequency in quiescent water to match the wave excitation (even variable) is performed by the controller. Besides the control algorithms, the control system includes the motor/generator and can adjust K to achieve the goal frequency.

In some embodiments, different Power Take-Off (PTO) systems can be used, including but not limited to (a) Pneumatic generator, (b) Belt-pulley transmission with rotary generator, (c) Linear generator with direct transmission.

It is believed that the present teachings are particularly useful for, but not limited to, technologies including ocean observation, surveillance and navigation buoys; underwater vehicle charging stations; offshore marine aquaculture; marine algae; seawater mining for minerals and gasses; desalination; coastal resiliency and disaster recovery; and isolated power systems/community microgrids. All these applications of the Blue Economy may be far away from a conventional energy source, but they are in the middle of MHK energy, which is renewable, abundant, and available everywhere in the oceans.

The present teachings provide a method and system that is environmentally friendly and can harness energy even from slow currents, which are omnipresent in the oceans, as well as from waves.

A vibrant MHK energy industry will support the effort of slowing global warming and will create jobs in manufacturing, engineering, installation and sales. It has been estimated that a total of 19 GW of electrical power generation is technically recoverable from ocean currents in U.S. waters. This resource is equivalent to 4.1% of the 466 GW total average U.S. power production during 2015. Hydrokinetic power production from U.S. rivers/tides will benefit from the proposed research, with extractable power of 14 GW/50 GW, respectively. These resources provide a U.S. in-stream hydrokinetic power potential of 83 GW, which is equivalent to 18% of 2015 average total U.S. power production. This resource is in 200-500 m depth from S. Florida to N. Carolina. Energy density of 3.3 kW/m2 exists off S. Florida, 30 m below sea surface. This is 6.6 times the density required by NREL to characterize a wind energy site as "excellent".

In addition, the VIVACE-W Converter will harness energy from waves. Several coastal and island communities including Hawaii, and the East and West coasts of the US have massive energy needs, as illustrated in Table 1. The wave resource in these areas is abundant. As an example, the waves at the state of Oregon have a wave power density of 31 kW/m.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vortex induced vibration for aquatic clean energy (VIVACE) converter comprising:
    a plurality of bodies on spring elements configured to experience flow induced oscillation and wave-induced motions as a result of hydrokinetic energy from at least one of the group consisting of ocean currents, tides, rivers, and waves, wherein the spring elements comprise adjustable spring constants such that the plurality of bodies can comprise an adjustable natural period of oscillation to enable oscillation resonance of the plurality of bodies in response to incident waves to capture a maximum of incoming wave energy; and
    a controller configured to adjust the adjustable spring constants such that the natural period of oscillation of the plurality of bodies is equal to an incident wave period.

2. The VIVACE converter according to claim 1 wherein the plurality of bodies are configured to be submerged within a wave-zone, wherein the wave-zone comprises an upper portion of a water body where waves are present to a depth equal to no less than half of the length of the longest wave present.

3. The VIVACE converter according to claim 2 wherein the plurality of bodies is configured to respond to wave excitation while remaining submerged in the wave zone.

4. The VIVACE converter according to claim 1 wherein the spring elements for a first of the plurality of bodies has a first spring constant and the spring elements for a second of the plurality of bodies has a second spring constant, the first spring constant being different than the second spring constant.

5. The VIVACE converter according to claim 1 wherein the plurality of bodies each has a cross-sectional shape chosen from the group consisting of circular, elliptical, or polygonal.

6. The VIVACE converter according to claim 1 wherein the plurality of bodies are rigid.

7. The VIVACE converter according to claim 1 wherein the plurality of bodies are flexible.

8. The VIVACE converter according to claim 1 wherein the plurality of bodies are solid.

9. The VIVACE converter according to claim 1 wherein the plurality of bodies are hollow.

10. The VIVACE converter according to claim 1 wherein the plurality of bodies each comprises a smooth exterior surface configured to promote flow induced oscillations consisting of Vortex Induced Vibrations, galloping, and their coexistence.

11. The VIVACE converter according to claim 1 wherein the plurality of bodies each comprises a rough exterior surface configured to promote flow induced oscillations consisting of Vortex Induced Vibrations, galloping, and their coexistence.

* * * * *